United States Patent [19]

Paitson et al.

[11] 4,108,272
[45] Aug. 22, 1978

[54] RAPID FIRE AIR GUN

[75] Inventors: John Lloyd Paitson, Galveston; Robert N. Hendley, Houston, both of Tex.

[73] Assignee: Western Geophysical Co. of America, Houston, Tex.

[21] Appl. No.: 796,494

[22] Filed: May 12, 1977

[51] Int. Cl.² ............................................. G01V 1/38
[52] U.S. Cl. .................................. 181/120; 181/115; 181/118
[58] Field of Search ................ 181/115, 118, 120, 111

[56] References Cited
U.S. PATENT DOCUMENTS

| | | | |
|---|---|---|---|
| 3,406,778 | 10/1968 | Barry et al. | 181/118 |
| 3,416,621 | 12/1968 | Balashkand et al. | 181/118 |
| 3,893,539 | 7/1975 | Mott-Smith | 181/120 |
| 3,953,826 | 4/1976 | Brundrit et al. | 181/120 |
| 4,006,794 | 2/1977 | Itria | 181/120 |
| 4,038,630 | 7/1977 | Chelminski | 181/111 |
| 4,049,078 | 9/1977 | Paitson et al. | 181/120 |

Primary Examiner—Howard A. Birmiel
Attorney, Agent, or Firm—William A. Knox

[57] ABSTRACT

A rapid-fire air gun for generating acoustic pulses in a body of water includes a reservoir of high-pressure air, a shut-off valve, and a throttle valve for admitting air to an attached firing chamber. The firing chamber has an exhaust port that is sealed by a spring-loaded exhaust valve. When the shutoff valve is open, high pressure air is admitted to the firing chamber through the throttle valve at a rate depending upon the effective aperture through the throttle valve. The exhaust valve is set to open at some selected pressure and to close at some lower pressure. When the air pressure in the firing chamber exceeds the pressure setting of the exhaust valve, the valve opens to impulsively release a jet of high pressure air which generates an acoustic pulse. When the air pressure in the firing chamber drops, the valve closes and the air pressure again builds up in the firing chamber. A series of such openings and closings generates a pulse train. The pulse repetition rate, that is the frequency of the pulse train, depends on the throttle valve setting and/or the tension of the exhaust valve load spring.

4 Claims, 5 Drawing Figures

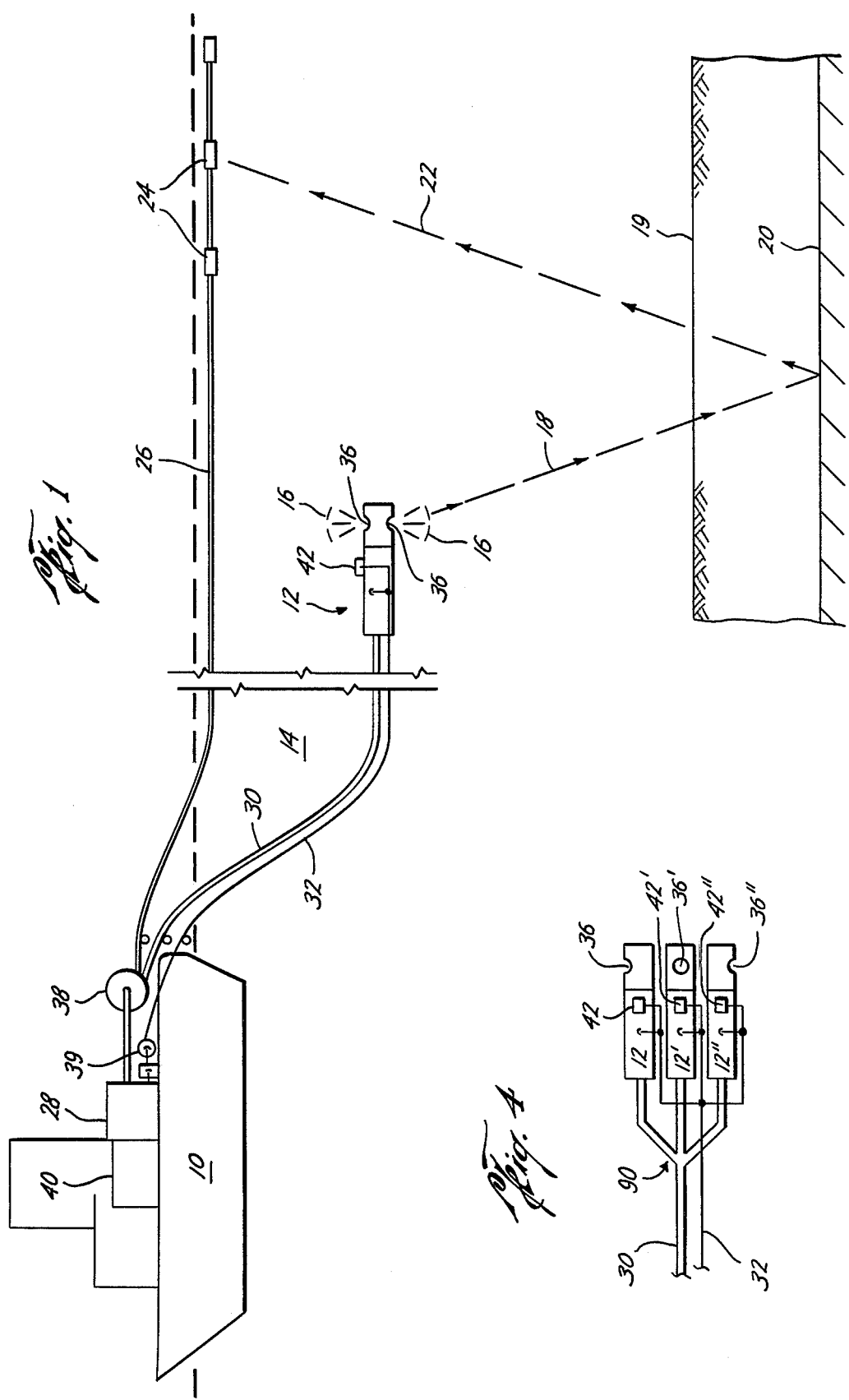

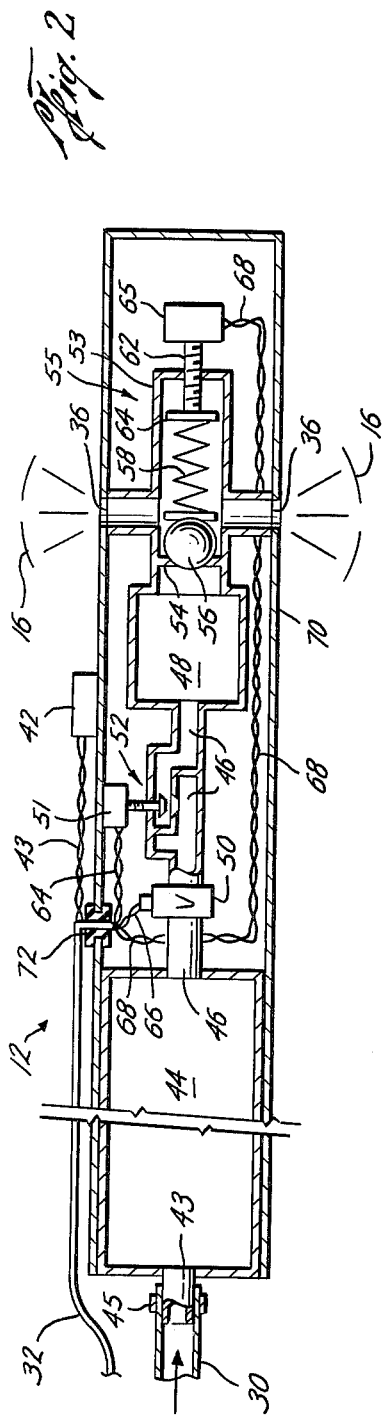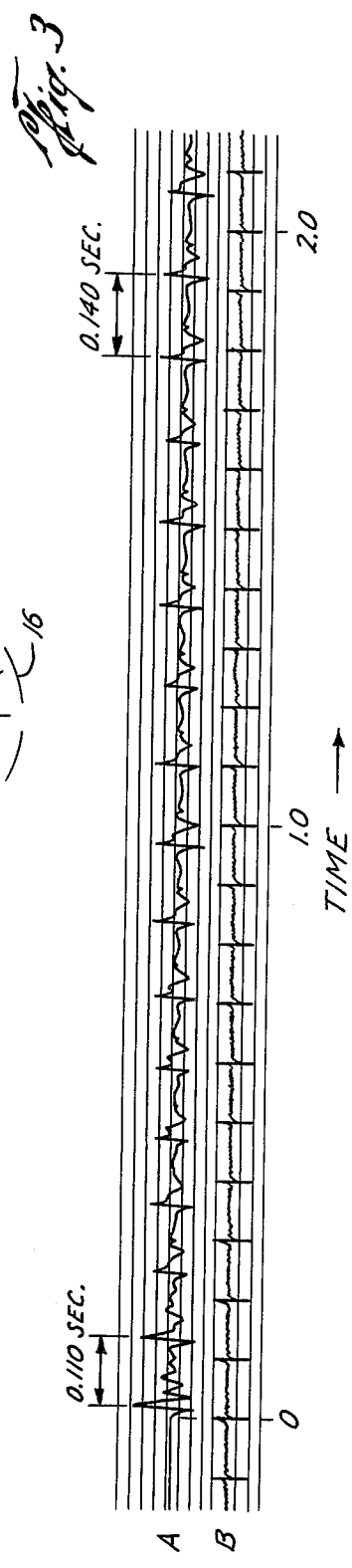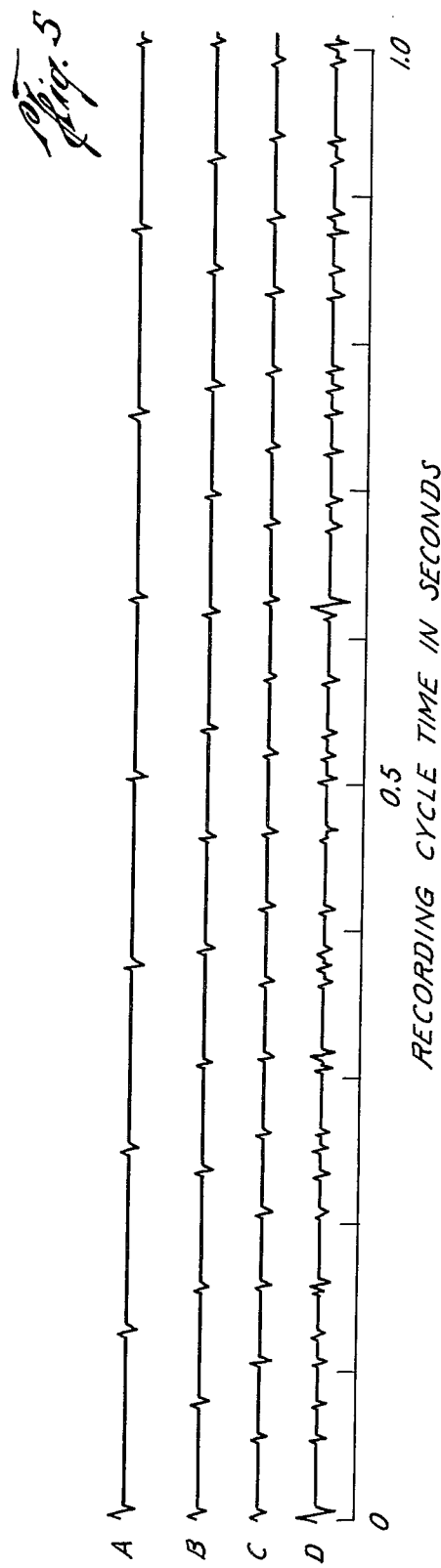

RAPID FIRE AIR GUN

BACKGROUND OF THE INVENTION

1. Field of the Invention

This invention relates to an air gun for generating an acoustic pulse train in a body of water.

2. Description of Related Prior Art

In one method of land seismic exploration, described, for example in U.S. Pat. No. 3,688,124, a sweep or chirp signal, generated by a vibrator, is injected into the ground. The chirp-signal, also referred to as a swept-frequency signal, is a unique wave train whose frequency pattern is non-repetitive during a period of time that is at least twice as long as the maximum reflection travel time. The reflected signals, which are detected by geophones laid on the surface of the earth, are recorded on magnetic tape. The recorded reflected signals are cross-correlated with a replica of the original chirp-signal to produce a correlogram.

Because of the great commercial success of vibrators on land, workers in the seismic art have for many years attempted to adapt land vibrators for use at sea. But serious problems were encountered. The marine vibrators were hydraulically or pneumatically operated. They generally took the form of large bellow or vibrating diaphragms many feet in diameter. A typical such device is disclosed in U.S. Pat. No. 3,394,775. Because marine vibrators were large and bulky, they were at first installed in a well, cut in the hull of a ship. The constant vibration from the vibrator caused fatigue-cracks throughout the ship's structure. Later, the vibrators were trailed in the water alongside the ship from booms, as described in U.S. Pat. No. 3,452,327. The heavy, unwieldy vibrators, with their multiplicity of hydraulic and/or pneumatic control hoses, required complex handling gear on the support ship. Furthermore, since they were designed primarily for seismic efficiency, the vibrators were hydrodynamically unstable, they trailed erratically when under tow and required a large towing force.

The seismic chirp-signal generated during a recording cycle by the vibrator discussed above is a continuous oscillatory wave train of 5 to 15 seconds duration. The initial and final frequencies of the signal lie within the useful seismic spectrum, usually within the range of 3 to 100 Hz. A typical chirp-signal, for example, might start at 5 Hz and terminate at 40 Hz. Many other frequency ranges are in common use.

It is possible to generate and analogous signal in the form of a discrete pulse train. The interval between successive pulses may be likened to the period of a wavelet, the period being the reciprocal of the frequency. In a marine environment, a relatively low-frequency discrete pulse train can be generated by a gas or air gun of any type well known to the art. One such method is described in an article beginning on page 673 of the August, 1973 issue of *Geophysics*. As pointed out by the author however, state-of-the-art air or gas guns are limited to equivalent frequencies of up to 7 Hz. Such a restricted, relatively low-frequency range for the seismic spectrum is unsuitable for general use with accepted chirp-signal correlation techniques.

Typical air guns used in seismic exploration, are described in U.S. Pat. Nos. 3,638,752, 3,249,177 and 3,276,534. All of these air guns are "one shot" sound sources. That is, for each recording cycle of 5 to 15 seconds, the gun is fired but once.

Other pulse-generating devices, such as a pulsed sonar or marine sparker, are available. However, pulsed-sonar devices do not have sufficient output power to penetrate the earth to a depth that is commercially useful in oil exploration. Because of practical physical limitations of the input power versus capacitor charging rate, the firing repetition rate or equivalent frequency of a sparker is, at best, only a few Hertz. A typical range is 1 to 4 Hz.

In application Ser. No. 647,549, now U.S. Pat. No. 4,049,078, issued to the assignee of this application, a "Marine Acoustic Pulse Train Generator" is disclosed. Basically, in the device of the earlier application a sleeve valve is slidingly mounted within the barrel of the air gun. Driven by a rotary cam, through a mechanical linkage, the sleeve valve is reciprocatingly driven to open and close an exhaust port in the gun barrel. Although the gun accomplished its purpose of generating a pulse train at a desired frequency in the water, the complexity of the cam and linkage mechanism rendered the gun difficult to maintain. An object of the present invention is to provide a somewhat simpler, rapid-fire air gun.

SUMMARY OF THE INVENTION

It is the object of this invention to provide a seismic exploration apparatus for generating a continuous acoustic pulse train of several seconds duration, in a body of water during a single seismic recording cycle. During the recording or operating cycle, the frequency or repetition rate of the pulses making up the pulse train is continuously variable over a desired range. By way of example but in no way thereto restricted, the frequency may be varied from 3 to at least 50 Hertz (cycles per second) during a 6-second cycle.

In a preferred embodiment the apparatus is an air gun. The air gun includes a reservoir of high pressure air and a firing chamber. The reservoir is in fluid communication with the firing chamber by means of a passageway having a throttling aperture or orifice of predetermined dimensions. The firing chamber includes an exhaust port that is releasably sealed by a spring-loaded exhaust valve. When the air pressure in the firing chamber reaches a preselected pressure, the exhaust valve opens impulsively to release an air jet through the exhaust port to create an acoustic pulse. The exhaust valve closes when the firing chamber pressure drops to a predetermined lower pressure. After the exhaust valve closes and the air pressure in the firing chamber builds back up to firing pressure, a second acoustic pulse is generated. The above sequence of events is repeated many times at rapid intervals to generate a train of acoustic impulses. The time interval between successive openings of the exhaust valve, is the pulse repetition rate. The frequency of the pulse train is the reciprocal of the pulse repetition rate. The frequency depends upon the rate of air-pressure build-up in the firing chamber.

In accordance with an important aspect of this invention, the build-up rate and hence the frequency of the acoustic pulse train depends upon the size of the throttling orifice, upon the volume of the firing chamber, and upon the exhaust-valve spring tension. If the firing chamber volume and the spring tension remain fixed, the pulse train frequency is adjusted by adjusting the throttle-orifice dimensions. If the volume of the firing chamber and the size of the throttle orifice remain fixed, the exhaust-valve spring tension can be changed to change the pulse repetition rate.

In accordance with one aspect of this invention, the effective aperture of the throttle orifice may be adjusted by means of a needle valve. The needle valve may be operated manually or preferably by a programmable electric motor. The motor may be programmed to change the effective aperture continuously with respect to time to generate a chirp signal. In an alternate embodiment, the needle valve is actuated incrementally by a stepping motor. The stepping motor is programmed to change the effective aperture of the orifice by small increments over short time periods during a recording cycle.

In accordance with another aspect of this invention, the throttle orifice aperture and the firing chamber volume remain fixed. The exhaust-valve spring tension is varied continuously, either manually or by an electric motor, with respect to time, to generate a chirp-signal. In an alternate embodiment, the exhaust-valve spring tension is changed incrementally by a stepping motor.

In accordance with a feature of this invention, a shutoff valve is provided in the passageway between the reservoir and the throttle orifice. A pulse train is initiated by opening the shutoff valve and is terminated by closing the shutoff valve. In a preferred embodiment the shutoff valve is a solenoid-operated shutoff valve. In another preferred embodiment, the shutoff valve is combined with a fixed-dimensioned throttle orifice.

In accordance with another feature of this invention, several guns are grouped together in a cluster. Each gun is tuned to a different, constant frequency or pulse repetition rate. During a recording cycle, the guns are operated simultaneously. The frequencies of the several constant-frequency pulse trains can be selected so that the several pulse trains combine to produce a single pulse train which is non-repetitive over a given time interval.

BRIEF DESCRIPTION OF THE DRAWINGS

FIG. 1 is a schematic representation of the manner of using the invention for marine seismic exploration;

FIG. 2 is a cross-sectional view of a preferred embodiment of the air-gun pulse train generator of this invention with the exhaust valve shown in its closed position;

FIG. 3 is a field recording showing the underwater pressure signature of a chirp signal produced by the air gun;

FIG. 4 is a schematic diagram of the combined use of three fixed-frequency guns; and FIG. 5 illustrates the composite pulse train resulting from use of three guns tuned to different fixed frequencies.

DETAILED DESCRIPTION OF THE INVENTION

Referring to FIG. 1, ship 10 tows a pulse-train generator 12 such as an air gun, through a body of water 14. At desired locations, to initiate each recording cycle, the air gun is triggered to generate a pulse-train that is produced by a series of high-pressure air jets 16 released into the water. The pulse-train travels along raypath 18, through water 14 and penetrates the water-earth interface 19. Continuing downwards, the signal is reflected from a subsurface formation 20, and returns to the water surface along raypath 22. The reflected pulse train is detected by seismic sensors 24 embeddded in a long streamer cable 26 which is also towed by vessel 10. The duration of a recording cycle, that is the time elapsed between triggering of the pulse train generator and the detection of the deepest reflection of interest, may be 5 to 15 seconds or more.

Air compressor 28 on vessel 10 feeds high pressure air to air gun 12 through a high-pressure air hose 30. Electrical cable 32 connects the air gun to signal processing and control unit 40 on the vessel. Control unit 40 programs air gun 12 to emit a train of air jets through exhaust ports 36 at consecutive intervals which may be uniform or non-uniform at the option of the operator, as will be described below. Streamer cable 26 and air hose 30 are stowed aboard ship 10 on reel 38, when not in use. Cable 32 is stowed on reel 39.

Signal processing and control unit 40 includes programming electronics to initiate and terminate operation of air gun 12 and to alter the length and characteristics of the emitted pulse train. Further included is a multichannel amplifier, digitizer, and recording system (not shown) of any well known type to receive and record reflected seismic signals from the hydrophones 24.

A strong-field externally-mounted, seismic pressure sensor 42 is secured to air gun 12 to monitor the pressure signature, that is, the characteristics of the pulse train emitted by the air gun. The output of sensor 42, the monitor signal, is sent to signal processing and control unit 40 over cable 32 which may contain a number of seperate conductors.

FIG. 2 is a sectional view of one embodiment of the air gun of this invention. The gun includes a high-pressure air reservoir 44 and a passageway 46 to allow fluid communication between reservoir 44 and a firing chamber 48. Reservoir 44 could, of course, be located remotely with respect to the remainder of gun 12, such as aboard ship 10, but preferably reservoir 44 is an integral part of gun 12 as illustrated. Installed in passageway 46 are a solenoid-actuated shutoff valve 50 and a throttle valve 52 such as a needle valve. An exhaust valve 55 is preferably secured to the end of firing chamber 48 that is opposite to passageway 46. Exhaust valve assembly 55 contains a valve seat 54 having an aperture, a ball valve 56 which is loaded by compression spring 58, and has at least one exhaust port 36. The entire exhaust valve assembly is contained within a housing 53. The pressure of spring 58 against ball valve 56 is adjusted by adjustment screw 62 bearing against washer 64. Adjustment screw 62 may be turned manually or by means of an electric motor 65 in response to signals transmitted over conductor pair 68 from signal processing and control unit 40. Conductor pair 68 forms a part of cable 32. Motor 65 may alternatively be a stepping motor of any well known type. The entire assembly above described is contained within an outer housing 70. Conductor pairs 64, 66, 68 join cable 32 through a water-proof grommet 72. Leads from sensor 42 may be spliced into cable 32 at this point.

Reservoir 44 is designed to receive a continuous supply of compressed air at a pressure of up to about 5000 psi or more, from compressor 28 through high-pressure hose 30. Hose 30 is coupled to the inlet 43 of reservoir 44 by hose clamp 45. The volume of reservoir 44 may be 500 to 1000 cubic inches. The exact volume is not critical except that it must be sufficiently larger than the volume of firing chamber 48 to provide a substantially constant-pressure air supply when the gun is operating.

Shutoff valve 50 is a solenoid-operated valve having a pressure rating well in excess of the operating pressure. A suitable commercial solenoid shutoff valve is made by Teledyne-Republic of Cleveland, Ohio. The aperture of the valve seat is available in increments of ⅛ ranging from ⅛ to ½ in diameter.

Throttle valve 52 may be any well-known commercial high-pressure needle valve, the effective aperture of whose seat, at maximum opening, has a diameter at least as large as the aperture of the seat of shutoff valve 50. Throttle valve 52 can of course, be manually operated or operated by a programmable electric motor 51. Motor 51 is programmed by signals fed from signal processor 40 through twisted wire pair 64, which forms a part of cable 32. Solenoid shutoff valve 50 is similarly controlled by electrical signals transmitted through twisted wire pair 66 which is also a part of cable 32.

Monitor hydrophone 42 is attached to the gun assembly 12 near exhaust port 36. Signals from monitor hydrophone 42 are transmitted to signal processing and control unit 40 over a conductor pair 43 which is a part of control cable 32.

Firing chamber 48 is preferably cylindrical and contains a volume of 10 to 20 cubic inches. It must, of course, withstand the working pressure of up to 5000 psi plus a substantial safety factor. The exhaust end of the firing chamber is provided with an exhaust valve assembly 55. The basic assembly as illustrated in FIG. 2 is a modified commercial pressure relief valve made by the Hydro-Seal Company of Kilgore, Texas. Although a flat or tapered valve and seat could be used, the spring-loaded ball valve as illustrated, is preferred.

An important aspect of this invention for seismic operations resides in the construction and operation of exhaust valve assembly 55. In a conventional relief valve of the spring-loaded ball type (or any other type for that matter, such as a flat valve) pressurized fluid presses against the bottom area of the that is exposed through an aperture in the valve seat. When the fluid-dynamic force exceeds the compressive force of the load-spring, the valve opens to quiescently relieve the overpressure. To suppress valve chatter, damping is applied to the movable element of the relief valve. Sufficient clearance is provided between the perimeter of the valve ball and the inner wall of the ball passageway to allow the pressurized fluid to escape freely around the ball and through an exhaust port when the valve is first cracked open by the overpressure. The exhaust port in the valve housing may be located in any convient spot above the valve seat.

The exhaust valve of this invention differs in three ways from a standard relief valve. First, little or no damping is applied to the moving element of the valve (valve ball 56). Accordingly, under the proper conditions of load-spring force on the one hand and fluid-dynamic force on the other hand, acting on opposite sides of the valve ball, taken in conjunction with the firing-chamber volume, the exhaust valve assembly becomes a self-excited oscillatory system. If the magnitudes of all other parameters are fixed, the force of the load-spring controls the frequency of the system. Operation of the system is analogous to the operation of an undamped diesel-engine fuel-injection valve system which is described in section 7.8 of the book "Mechanical Vibration", pages 313—317, by Den Hartog, Fourth Edition, published by McGraw-Hill Book Co., New York.

The second departure of the exhaust valve from a standard relief valve structure lies in the positioning of exhaust port 36 of valve assembly 55 with respect to the closed position of the ball 56. In this invention, port 36 must lie beyond the centerline of the ball. The ball 56 must move rightwards past exhaust port 36 before an air jet 16 can be emitted.

Thirdly, the clearance between valve ball 56 and the inner wall 57 of the valve housing 53 must be so restricted as to prevent any substantial air leakage or blowby around the ball in a manner now to be described.

In the operation of the exhaust valve, the fluid pressure in chamber 48 acts against that portion of the area of ball 56 that is exposed through the aperture in seat 54, to create a force to the right. When that force exceeds a selected value, ball 56 starts to move to the right but because of the restricted clearance between ball 56 and inner wall 57 of housing 53, the pressurized fluid, air in this case, cannot readily escape around the ball. Accordingly, at the instant that ball 56 is moved from seat 54, the entire area of the left half of ball 56 is suddenly exposed to the pressurized air. The abrupt increase in force due to the air pressure acting against the suddenly enlarged area of the ball, abruptly accelerates ball 56 to the right until exhaust port 36 is uncovered. When ball 56 clears exhaust port 36, the air in chamber 48 is impulsively released into the water as a high pressure jet to generate the desired acoustic pulse. The ball remains open until the pressure in chamber 48 drops sufficiently for the compressive force of spring 58 to overcome the fluid-dynamic forces, acting on the left half of the ball 56, at which point exhaust valve 55 closes. After the air pressure builds up again in chamber 48 the above described opening-closing cycle is repeated.

The time interval between opening cycles, or the pulse repetition rate, depends on the air pressure in chamber 48, upon the volume of the firing chamber 48, upon the flow rate of air through throttle valve 52, and upon the tension of spring 58. Assuming that the air pressure and chamber volume remain constant, the pulse repetition rate is controlled either by throttle valve 52 or spring tension screw 62. Either on of the two pulse repetition-rate control means may be used alone, or both control means may be adjusted simultaneously.

In one embodiment of the above described gun, the spring constant is 2500 lb/in, the ball diameter is 0.75 in, the diameter of the aperture in the ball seat is 0.375 in, the volume of the firing chamber is 10 cubic inches, the air pressure was about 2000 psi, the required travel of the ball to uncover the exhaust ports is 0.125 in. Accordingly, the spring tension must be adjusted to about 220 lb. to just hold the ball closed against the firing chamber pressure. If the air pressure is raised slightly, so that the ball valve is cracked open, the exposed hemispheric area of the ball is quadrupled so that the force, to the right, on the ball is 880 lb. When the ball travels to the right to uncover the exhaust ports, the spring force is 220 + (2500 × 0.125) = 532 lb. But now, air freely escapes through exhaust ports 36, in a direction tangential to the ball so that the lifting force abruptly diminishes. As the ball reenters the portion of valve housing 53 between exhaust ports 36 and seat 54, the ball is again subjected to the lifting force due to the residual air pressure in firing chamber 48, working against the exposed hemisphere of the ball. In this intermediate position, it is possible for ball 56 to flutter, producing an undesirable "soft" air emission. To avoid flutter, the gun must be experimentally tuned by adjusting the spring constant, the throttle valve orifice size and/or the firing chamber volume. Properly tuned, each opening of exhaust valve 55 releases a quantity of air sufficient to reduce the firing chamber air pressure to a value that will allow spring 58 to firmly return ball 56 to seat 54. In the example, the air pressure must drop below 1210 psi. In this example, the aperture in the ball seat is substantially larger than the throttle valve orifice so that the compressed air in the firing chamber will escape through the exhaust ports faster than the fresh supply of air can be admitted to the firing chamber through the throttle orifice. The above aperture/orifice relationship must exist in order to allow the ball valve to close.

To operate the gun, air reservoir 44 is charged with compressed air from compressor 28 through hose 30. To start a recording cycle and to generate a pulse train, an electrical fire control signal is sent from control unit 40, to solenoid shutoff valve 50 over twisted wire pair 66. The fire control signal opens valve 50 to admit air to firing chamber 48. When the air pressure in chamber 48 reaches firing pressure, gun 12 generates a pulse train in the manner described in previous paragraphs. The duration of the pulse train may be up to fifteen seconds or more. The gun is stopped by shutting off the air supply to firing chamber 48, when shutoff valve 50 is deactivated.

FIG. 3 is an oscillographic time-scale field recording of the pressure signature in the form of a swept-frequency pulse train generated in the water by the gun of this invention. Trace A is the output signal of monitoring seismic pressure-sensor 42, attached to gun 12. The sharp pulses or spikes on the trace are due to the acoustic pulses generated each time the gun fires. In this example, the pulse repetition rate decreases from about 9 Hertz at time 0 to about 7 Hertz over an interval of 2.1 seconds or about one Hertz per second. The vertical marks on trace B at the bottom of the recording represent time intervals of 0.1 second. Time 0.0 is the instant that a fire control signal was sent to open shutoff valve 50.

As stated above, the pulse repetition rate is altered by changing the control parameters of air flow rate or load-spring tension or both. A decreased air flow or increased spring tension, slows the pulse repetition rate to a lower frequency. A constant-frequency pulse train results when the control parameters are left unchanged during a recording cycle. A swept-frequency or chirp signal is generated by continuously varying one or both of the control parameters during a recording cycle as in FIG. 3.

It will be apparent to those skilled in the art, that throttle valve 52 with its variable-sized orifice could be removed. In its place, a fixed-apreture throttling orifice could be incorporated into shutoff valve 50. The pulse repetition rate would then be controlled solely by the tension of load-spring 58. Elimination of throttle valve 52 would, of course, simplify the mechanical complexity of the gun as well as the ancillary control circuitry.

Thus far, the description of this invention has been confined to use of a single gun to produce a train of impulses having a continuously changing pulse repetition rate during a recording cycle. Such a pulse train has a non-repetitive pulse pattern during a recording cycle. The pulse repetition rate or frequency is changed by continuously adjusting the ball-valve spring tension to change the air-pressure build-up rate. The required motors and control circuitry of course, complicate the construction and maintenance of the gun. In an alternate embodiment of this invention, three or more guns are grouped together. Each gun is tuned to emit a different fixed pulse frequency. The group of three guns is then maintanined in operation during a recording cycle. The three pulse trains merge together to form a single pulse train which is non-repetitive during a recording cycle if the three frequencies are properly chosen. A simple choice satisfying this requirement is to select incommensurate periods for the three trains.

FIG. 4 shows a bundle of three guns 12, 12', 12''. The air supply from air hose 30 is fed to the three guns through manifold 90. Each of the three guns is manually tuned to a fixed frequency by manually adjusting the respective adjusting screws 62 (not shown in FIG. 4). The throttle valve 52 of FIG. 2 may be eliminated and instead replaced by a fixed throttling orifice.

FIG. 5 shows a series of oscillogram traces A, B, C of the output signals generated by the individual guns 12, 12', 12''. As an example, in trace A, the pulse frequency is 8 Hz, trace B is 13 Hz and trace C is $19\frac{1}{4}$ Hz. The composite pulse train generated by the three guns operating together is shown in trace D. The pulse repetition rate as illustrated by trace D is constantly changing throughout the duration of the exemplary one-second recording cycle as is desired. In this instance, the pulse repetition rate is effectively pseudo-random. Other frequency combinations and recording-cycle lengths can of course be used without departing from the scope of this invention. Although in the alternate embodiment, three separate guns are required, the reduction in mechanical complexity is a decided advantage in relation to cost and reduced maintenance. Use of a bundle of several guns, each tuned to a different frequency is directed to the generation of a composite train of discrete pulses having an effectively random pulse repetition rate. The effectiveness as a seismic source of the set of guns increases with the number of guns used so long as the pulse frequencies of the guns are incommensurate. The gun grouping does not operate to shape the power spectra of the individual pulses such as is taught by U.S. Pat. No. 3,437,170.

This invention has been described and illustrated in terms of preferred embodiments, but variations in the structure and operation may be made without departing from the scope and spirit of the appended claims. For example, steam or other compressible fluids could be used in place of compressed air.

We claim as our invention:

1. A rapid-fire air gun for generating, in a body of water, a variable-frequency sonic chirp signal consisting of a train of discrete acoustic pulses having continuously varying periods therebetween during a recording cycle, the gun being useful in seismic exploration of underground strata, said gun comprising:

a firing chamber for containing a volume of compressed air, the chamber having an air inlet coupled to a compressed air source, an air outlet, and a self-excitable oscillatory valve assembly for repeatedly opening and closing said outlet so that air jets may be released into the water from said outlet at a desired frequency;

an elongated housing having a sidewall for enclosing the exhaust valve assembly, one end of the housing abutting said air outlet, with a valve seat having an aperture, mounted therebetween;

a valve element, having first and second faces, slidably mounted on said housing, the first face of said valve element being sealingly engagable with said seat for releasably closing said air outlet, a portion of the area of the first face of said valve element being exposed to the air pressure in the firing chamber through the valve-seat aperture when the valve element engages the valve seat;

an exhaust port in the sidewall of said housing for allowing escape of compressed air when the air outlet is open, the exhaust port being positioned adjacent the face of the valve element that is opposite from the valve seat when the first face of said valve element engages said valve seat;

spring means bearing against the second face of said valve element for urging said first face to engage said valve seat in opposition to the force developed by the firing-chamber air pressure acting against the portion of the area of said first face of said valve element that is exposed through said valve-seat aperture;

a spring-loading adjusting means including a motor-driven adjustment screw for continuously regulating the compressive force of said spring means so that the self-excitation frequency of said valve assembly is continuously varied during a recording cycle.

2. The air gun as defined in claim 1 wherein the drive motor is a stepping motor for incrementally changing the spring compressive force during a recording cycle.

3. The air gun as defined in claim 1 including:

a continuously adjustable air-flow throttling means, coupled between said compressed air source and said air inlet, cooperating with said spring-loading adjusting means for continuously varying the force opposing the spring means so that the self-excitation frequency of said valve assembly is continuously varied during a recording cycle.

4. A rapid fire air gun for generating an acoustic chirp signal in a body of water during a recording cycle, for use in seismic exploration, said gun including a firing chamber for containing a volume of compressed air, said firing chamber being interconnected with a compressed air source and having an outlet for periodically discharging air jets, comprising:

a self-excitable valve assembly mounted adjacent said outlet for repeatedly opening and closing said outlet so that jets of compressed air are expelled from said firing chamber each time said valve assembly opens, at the excitation frequency of the valve assembly, said valve assembly including a valve seat, a compliantly-loaded, differential-area valve element for releasably engaging said valve seat, and means for continuously varying the compliant loading of said valve element during said recording cycle to vary the self-excitation frequency of said valve assembly.

* * * * *